(12) United States Patent
Sheha et al.

(10) Patent No.: US 8,090,534 B2
(45) Date of Patent: *Jan. 3, 2012

(54) METHOD AND SYSTEM FOR ENABLING AN OFF BOARD NAVIGATION SOLUTION

(75) Inventors: Michael A. Sheha, Laguna Nigel, CA (US); Angie Sheha, Laguna Nigel, CA (US); Mark Goddard, Rancho Santa Margarita, CA (US)

(73) Assignee: TeleCommunications Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/926,856

(22) Filed: Dec. 14, 2010

(65) Prior Publication Data

US 2011/0125396 A1 May 26, 2011

Related U.S. Application Data

(63) Continuation of application No. 11/242,818, filed on Oct. 3, 2005, now Pat. No. 7,856,315.

(60) Provisional application No. 60/615,089, filed on Oct. 1, 2004.

(51) Int. Cl.
*G01C 21/30* (2006.01)

(52) U.S. Cl. .................. 701/209; 701/211; 340/995.17; 340/995.23

(58) Field of Classification Search .......... 701/201–213; 340/995.14–995.26
See application file for complete search history.

(56) References Cited

U.S. PATENT DOCUMENTS

| | | | |
|---|---|---|---|
| 4,737,916 A | 4/1988 | Ogawa |
| 4,939,662 A | 7/1990 | Numura |
| 5,727,057 A | 3/1998 | Emery |
| 5,802,492 A | 9/1998 | DeLorme |
| 5,982,301 A | 11/1999 | Ohta |
| 5,987,381 A | 11/1999 | Oshizawa |
| 6,035,253 A | 3/2000 | Hayahi |
| 6,163,749 A | 12/2000 | McDonough et al. |
| 6,182,006 B1 | 1/2001 | Meek |
| 6,188,957 B1 | 2/2001 | Bechtolsheim |
| 6,249,742 B1 | 6/2001 | Frriederich |
| 6,278,936 B1 | 8/2001 | Jones |

(Continued)

FOREIGN PATENT DOCUMENTS

WO WO2006/039660 4/2006

OTHER PUBLICATIONS

International Search Report PCT/US2011/00917 dated Sep. 1, 2011.

*Primary Examiner* — Richard M. Camby
(74) *Attorney, Agent, or Firm* — William H. Bollman

(57) ABSTRACT

The present invention is directed to a method and system for providing off-board navigational information from a network server to a mobile communication device, such as a cellular phone. Specifically, upon receiving from the mobile communication device the real time location of the mobile communication device and a location or identification of a destination, the network server transmits to the mobile communication device routing information as well as audible navigation voice prompts. In accordance with the preferred embodiment, the routing information includes maneuver information for traveling from the real location of the mobile communication device to the destination, and the audible navigation voice prompts provide data for generating audible turn-by-turn instructions for traveling from the real time location of the mobile communication device to the destination.

14 Claims, 13 Drawing Sheets

U.S. PATENT DOCUMENTS

| | | |
|---|---|---|
| 6,321,158 B1 | 11/2001 | DeLorme |
| 6,366,856 B1 | 4/2002 | Johnson |
| 6,397,143 B1 | 5/2002 | Paschke |
| 6,415,224 B1 | 7/2002 | Wako |
| 6,434,482 B1 | 8/2002 | Oshida |
| 6,442,384 B1 | 8/2002 | Shah |
| 6,487,495 B1 | 11/2002 | Gale |
| 6,529,143 B2 | 3/2003 | Mikkola |
| 6,535,743 B1 | 3/2003 | Kennedy, III |
| 6,571,169 B2 | 5/2003 | Miyaki |
| 6,587,782 B1 | 7/2003 | Nocek |
| 6,643,516 B1 | 11/2003 | Stewart |
| 6,661,353 B1 | 12/2003 | Gopen |
| 6,665,613 B2 | 12/2003 | Duvall |
| 6,665,715 B1 | 12/2003 | Houri |
| 6,721,652 B1 | 4/2004 | Sanqunetti |
| 6,721,716 B1 | 4/2004 | Gross |
| 6,766,174 B1 | 7/2004 | Kenyon |
| 6,810,405 B1 | 10/2004 | LaRue |
| 6,829,532 B2 | 12/2004 | Obradovich |
| 6,839,630 B2 | 1/2005 | Sakamoto |
| 6,842,696 B2 | 1/2005 | Silvester |
| 6,845,321 B1 | 1/2005 | Kerns |
| 6,859,723 B2 | 2/2005 | Yokota |
| 6,898,516 B2 | 5/2005 | Pechatnikov |
| 6,910,818 B2 | 6/2005 | McLoone |
| 6,925,603 B1 | 8/2005 | Naito |
| 6,944,535 B2 | 9/2005 | Iwata |
| 6,999,875 B2 | 2/2006 | Tu |
| 7,043,362 B2 | 5/2006 | Krull |
| 7,058,506 B2 | 6/2006 | Kawase |
| 7,079,945 B1 | 7/2006 | Kaplan |
| 7,089,110 B2 | 8/2006 | Pechatnikov |
| 7,142,196 B1 | 11/2006 | Connor |
| 7,142,205 B2 | 11/2006 | Chithambaram |
| 7,167,187 B2 | 1/2007 | Scott |
| 7,171,304 B2 | 1/2007 | Wako |
| 7,202,801 B2 | 4/2007 | Chou |
| 7,266,376 B2 | 9/2007 | Nakagawa |
| 7,286,929 B2 | 10/2007 | Staton |
| 7,522,711 B1 | 4/2009 | Stein |
| 7,565,157 B1 | 7/2009 | Ortega |
| 7,653,544 B2 | 1/2010 | Bradley |
| 7,739,033 B2 | 6/2010 | Murata |
| 7,751,614 B2 | 7/2010 | Funakura |
| 7,774,003 B1 | 8/2010 | Ortega |
| 7,822,823 B2 | 10/2010 | Jhanji |
| 7,881,730 B2 | 2/2011 | Sheha |
| 2001/0015756 A1 | 8/2001 | Wilcock |
| 2001/0016849 A1 | 8/2001 | Squibbs |
| 2002/0130906 A1 | 9/2002 | Miyaki |
| 2003/0036848 A1 | 2/2003 | Sheha |
| 2003/0045327 A1 | 3/2003 | Kobayashi |
| 2003/0060938 A1 | 3/2003 | Duvall |
| 2003/0078054 A1 | 4/2003 | Okuda |
| 2003/0125064 A1 | 7/2003 | Koskinen |
| 2003/0126250 A1 | 7/2003 | Jhanji |
| 2003/0149526 A1 | 8/2003 | Zhou |
| 2003/0151501 A1 | 8/2003 | Teckchandani |
| 2003/0158657 A1 | 8/2003 | Agnew |
| 2003/0165254 A1 | 9/2003 | Chen |
| 2003/0231190 A1 | 12/2003 | Jawerth |
| 2003/0236618 A1 | 12/2003 | Kamikawa |
| 2004/0002814 A1 | 1/2004 | Gogic |
| 2004/0008225 A1 | 1/2004 | Cambell |
| 2004/0021567 A1 | 2/2004 | Dunn |
| 2004/0054428 A1 | 3/2004 | Sheha |
| 2004/0124977 A1 | 7/2004 | Biffar |
| 2004/0186880 A1 | 9/2004 | Yamamoto |
| 2004/0204829 A1 | 10/2004 | Endo |
| 2004/0205517 A1 | 10/2004 | Lampert |
| 2004/0220957 A1 | 11/2004 | McDonough |
| 2005/0027445 A1 | 2/2005 | McDonough |
| 2005/0062636 A1 | 3/2005 | Conway |
| 2005/0085999 A1 | 4/2005 | Onishi |
| 2005/0125148 A1 | 6/2005 | Van Buer |
| 2005/0159883 A1 | 7/2005 | Humphries |
| 2005/0242168 A1 | 11/2005 | Tesavis |
| 2006/0019724 A1 | 1/2006 | Bahl |
| 2006/0041375 A1 | 2/2006 | Witmer |
| 2006/0074547 A1 | 4/2006 | Kaufman |
| 2006/0200359 A1 | 9/2006 | Khan |
| 2006/0268120 A1 | 11/2006 | Funakura |
| 2006/0270421 A1 | 11/2006 | Phillips |
| 2007/0004461 A1 | 1/2007 | Bathina |
| 2007/0032244 A1 | 2/2007 | Counts |
| 2007/0083911 A1 | 4/2007 | Madden |
| 2007/0139411 A1 | 6/2007 | Jawerth |
| 2007/0208687 A1 | 9/2007 | O'Connor |
| 2008/0077324 A1 | 3/2008 | Hatano |
| 2008/0195314 A1 | 8/2008 | Green |
| 2008/0220747 A1 | 9/2008 | Ashkenazi |
| 2008/0288166 A1 | 11/2008 | Onishi |
| 2009/0113346 A1 | 4/2009 | Wickramasuriya |
| 2009/0177557 A1 | 7/2009 | Klein |
| 2009/0328163 A1 | 12/2009 | Preece |
| 2010/0004993 A1 | 1/2010 | Troy |
| 2010/0042592 A1 | 2/2010 | Stolz |

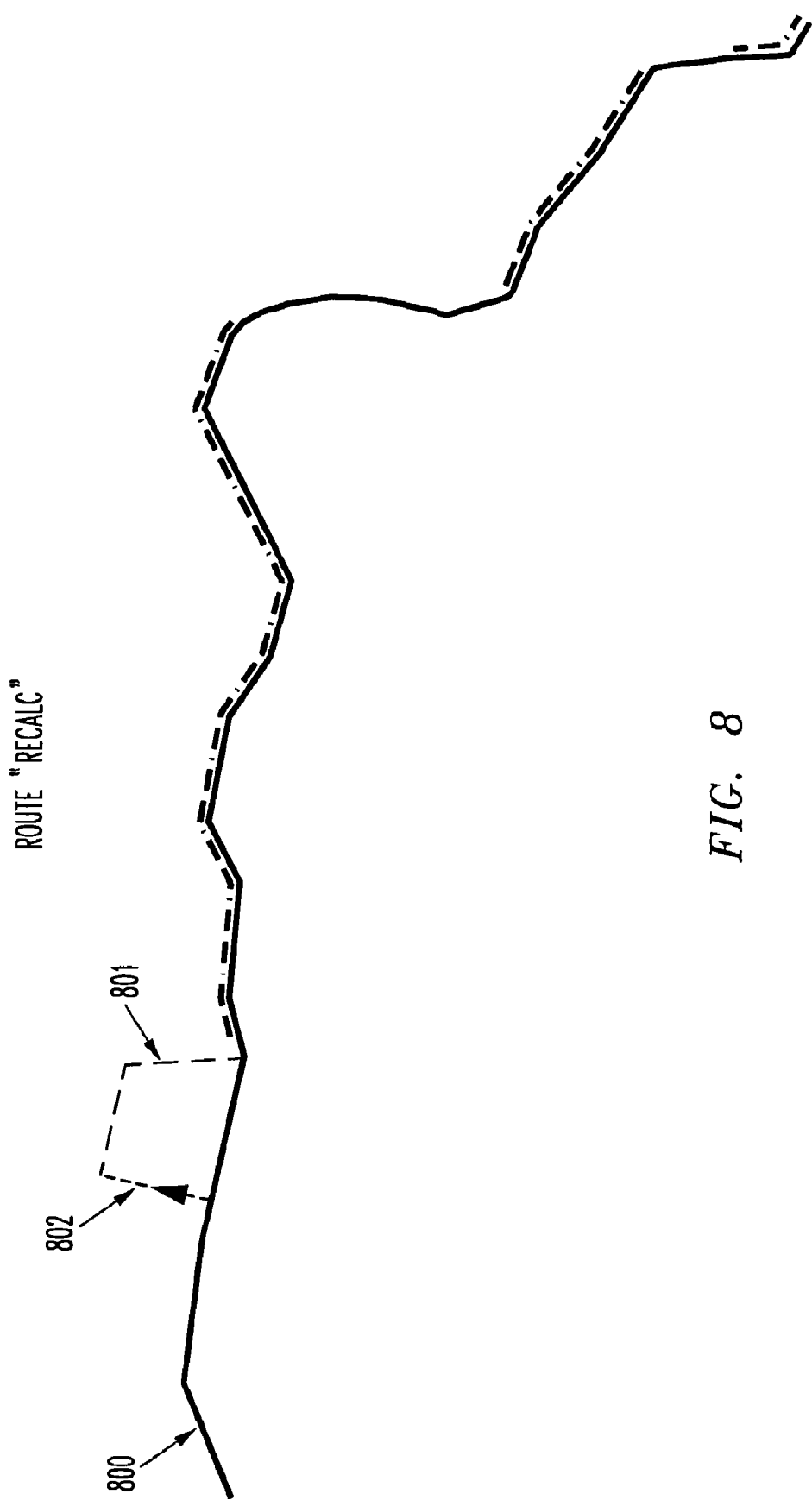

FIG. 9

The XML Scema for the communication between the client and server is provided below:

```
<?xml version="1.0" encoding="UTF-8" ?>
<schema targetNamespace= "http://www.opengis.net/xls" xmlns:xls="http://www.opengis.net/xls"
xmlns="http://www.w3.org/_u48 ?01/XMLSchema" xmlns:xls : gml="http://www.oprngis.net/gml"
elementFormDefault="qualified">
    <include schemaLocation="RouteService.xsd" />
    <simpleType name="VoiceStyleType">
        <annotation>
            <documentation>Supported voice style values.</documentation>
        </annotation>
        <restriction base="string">
            <enumeration value="Male" />
            <enumeration value="Female" />
        </restriction>
    </simpleType>
    <!--  Route reuest extention.
    -->
    <element name="DetermineNavigationRouteRequest" type="xls:DetermineNavigationRouteReuestType"
substitutionGroup="xls :_Requestparameters">
        <annotation>
            <documentation>Specifies the Determine Navigator Route reuest
parameters.</documentation>
        </annotation>
    </element>
    <complexType name="DetermineNavigatorRouteRequestType">
        <annotation>
```

———— CONTINUED ON SHEET 10/13 ————

FIG. 9

```
---------CONTINUED FROM SHEET 9/13---------
        <documentation>Defines the Determine Navigator Route reuest
parameters.</documentation>
      </annotation>
      <complexContent>
        <extention base="xls : DetermineRouteReuestType" >
          <sequence>
            <element ref:"xls : RouteNavigationParametersRequest" minOccurs="0" >
              <annotation>
                <documentation>Request parameters for navigation
routes.</documentation>
              </annotation>
            </element>
          </sequence>
        </extension>
      </complexContent>
</complexType>
<element name ="RouteNavigationParametersRequest" type="xls : RouteNavigationParametersRequestType" >
  <annotation>
    <documentation> The request parameters for navigator routes. </documentation>
  </annotation>
</element>
<complexType name="RouteNavigationParametersReuestType">
  <annotation>
    <documentation> Defines the request parameters for navigator routes. </documentation>
  </annotation>
  <sequence>
    <element ref="xls : VoiceStyleType"minOccurs="1" />
  </sequence>
</complexType>
<!--
--> Base voice download reuest

---------CONTINUED ON SHEET 11/13---------
```

```
---------------- CONTINUED FROM SHEET 10/13 ----------------
<element name="BaseVoicesRequest" type="xls:BaseVoicesRequestType"
substitutionGroup="xls:_ReuestParaemters">
    <annotation>
        <documentation>Download base navigation voices. </documentation>
    </annotation>
</element>
<complexType name="BaseVoicesReuestType" >
    <annotation>
        <documentation>Base navigation voices reuest.</documentation>
    </annotation>
    <complexContent>
        <extention base="xls : AbstractReuestParametersType">
            <sequence>
                <element ref="xls : VoicestyleType" minOccurs="1" />
            </sequence>
        </extension>
    </complexContent>
</complexType>
<element name="BaseVoicesResponse" type="xls : BaseVoicesResponseType"
substitutionGroup="xls:_ResponseParaemters">
    <annotation>
        <documentation>Base navigation voices download response</documentation>
    </annotation>
</element>
<complexType name ="BaseVoicesResponseType" >
    <sequence>
        <element name="baseVoices" type="base64" />
    </sequence>
</complexType>
</schema>
```

FIG. 9

METHOD AND SYSTEM FOR ENABLING AN OFF BOARD NAVIGATION SOLUTION

CROSS REFERENCE TO RELATED APPLICATIONS

The present invention is a continuation of U.S. patent application Ser. No. 11/242,818, entitled "Method and System for Enabling an Off Board Navigation Solution", filed on Oct. 3, 2005, which in turn claims priority from U.S. Provisional Application Ser. No. 60/615,089, entitled "Method and System for Enabling an Off Board Navigation Solution, filed Oct. 1, 2004, the contents of both of which are incorporated by reference herein.

BACKGROUND OF THE INVENTION

1. Field of the Invention

This present invention relates to enabling off-board voice-enabled real-time turn-by-turn navigation solutions for mobile devices, which typically are wireless devices, where the mobile device has information about its position on the planet. This invention provides the ability to obtain route snapshots from a remote client and/or server system, the cache and reuse of audio navigation voice prompts for network efficiency, and the ability to transmit location (i.e., GPS) history to a remote client and/or server system for the purpose of obtaining highly accurate real-time turn-by-turn voice prompted directions.

2. Description of the Related Art

Navigational devices are typically defined as devices that provide a unit's local position and a way of planning a course around the unit's local position, sometimes to a remote position, as in the case of an in-vehicle navigational device, also well known in the art. Typically, an in-vehicle navigation device consists of a display screen, processing unit, storage unit, and user input mechanism. The storage system typically contains, for example, maps and travel information used for navigational purposes. Travel information may include such POIs as local restaurants, theaters, municipality locations, and the like. Next generation wireless navigation devices, which typically run on cellular phones, need to execute in a resource limited environment, such as a small display screen, reduced processing unit, limited storage unit, and a limited user input mechanism. As wireless navigation devices become ubiquitous they will be required to function as well as in-vehicle navigation devices, while having significant resource restrictions. Some of these restrictions include a single sensor GPS receiver vs. the in-vehicle navigation device which typically includes a high sensitivity GPS device and complementary sensors known as dead-reckoning to those that are skilled in the art.

Determining one's position using a navigational device has typically been accomplished by integrating or connecting a Global Positioning System (GPS) device with various types of computing devices, such as a personal computer or handheld GPS unit. New positioning determination systems include network-assisted wireless location systems, such as Time-of-Arrival (TOA), and network-assisted GPS systems for determining the navigational device's position. The unit's location is then displayed on the device and is available for various applications, such as in the case of a commuter seeking the shortest route to a location in a specific area or a user wanting to find the nearest gas station.

Additionally, map programs are well known in the art, which provide a graphical representation of a set of geographical coordinates, such as streets and highways. These map programs can also be purchased with geocoded POI information, such as restaurants and movie theaters. Current map programs provide search capability for finding the desired POI information nearest to a given inputted geographical coordinate information, such as an address of a house, and getting driving directions to said location.

Wireless device software applications typically require communicating with other remote clients and/or server systems for the purpose of augmenting the capability of the local software application which typically runs in a resource limited environment, such as having a reduced amount of memory compared to personal computers, etc. Adding the ability to navigate on a wireless device requires that the software application obtain as much supplemental route information from a remote server as required to correctly construct the entire route. This is typically denoted to those skilled in the art as off-board navigation. Since the wireless software navigation device has many resource limitations, it is not capable of locally storing all of the necessary map data for calculating routes within a standard city radius. A problem exists since the device can not store all of the map data, it must obtain it from a remote device over the wireless channel. An additional problem exists since the wireless device has limited memory and navigation voice pronunciations are a highly desired feature of a navigation device (i.e., Turn Right on Lawrence Road). Due to the wireless device resource limitations, synthesizing voice data in real-time on the wireless device is typically not feasible due to the constrained memory conditions of the device. Thus, the device requires getting the voice data from the server. As people skilled in the art will appreciate, the wireless channel is typically also bandwidth limited and has a much higher cost per bit pricing when compared to the prior art Internet-based ISP (Internet Server Provider) pricing models.

Since wireless devices are inherently mobile in nature and typically only have a single GPS sensor solution, when compared to dead-reckoning system as present in almost all automotive in-vehicle systems, it becomes extremely difficult to determine where the device was previously located. Additionally, adding both GPS inaccuracies and map vector data inaccuracies, determining your initial starting route point becomes exceedingly difficult from a GPS fix as people skilled in the art will appreciate.

Thus, a need exists for a method and system that can optimize the capabilities of a mobile device for the purpose of enabling the mobile device to perform better than prior art in-vehicle navigation systems. This invention enables the mobile device to function and outperform prior art navigational systems that incorporate real-time voice prompted turn-by-turn directions and without the need of dead-reckoning and multiple sensors. This is accomplished by the combination of the server-client model.

SUMMARY OF THE INVENTION

It is an object of the present invention to provide a method and system for requesting and receiving audio navigation voice prompts from a remote client and/or server system in the form of sound audio files, such as a wave audio file format (.wav files), QCP audio format (Qualcomm's voice file format), MIDI audio format, MP3 audio format, or some other audio file format. People skilled in the art will appreciate that this is typically denoted as off-board navigation where a client requests remote navigation information from a remote client and/or server system.

It is an object of the present invention that the navigation system requests the off-board navigation route data, including audio navigation voice prompts, which was calculated using an origin route point and a destination route point, and which may include a plurality of waypoints. Other information that can be used for the computation of the route may include route style, such as fastest route, shortest route, avoid highways, etc., and a plurality of encoding flags, such as requesting that the route response, which can include the audio navigation prompts, be encoded and/or compressed upon transport across either a wired, wireless, or infrared connection.

It is an object of the present invention that the off-board remote client and/or server system responds to various route tag items, including but not limited to the route origin, route destination, and maneuver list, such as but not limited to: turn type, next turn type, location of turn, starting offset in the route geometry, length of the maneuver in the route geometry, origin street name, destination street name, distance to travel before the turn, estimated time to travel before the turn, distance from the turn to the destination, estimated travel time to the end of the route, estimated travel speed, original heading, maximum distance for audible instruction, and pronunciation code for the origin street. Additionally, the off-board remote client and/or server system returns the route geometry, including polyline map data of varying resolution, that provides full detail of all turn restrictions and other detailed road attributes (i.e., name, heading, etc.) including, but not limited to audio navigation voice prompts.

It is an object of the present invention that the off-board navigation route data received from the remote client and/or server system is based on a "route snapshot". A route snapshot is defined as a portion of a full route and may include the complete representation of the entire route from the origin to the destination of the route. A route is typically defined as containing a finite number of maneuvers or turns. A route snapshot can also include a fixed number of contiguous polyline map vector route points (i.e., a route segment or route line). The route snapshot can include any portion of the route, including a contiguous block of the route data, such as the origin, destination, waypoints, or any polyline vector data. It is an additional object of this invention that the size of the route snapshot that is returned to the local client is controlled by either the local client or the remote client/server, where the remote client/server typically has the final decision of how much of the route is returned. It is an additional object of this invention that the route snapshot enables the local client to obtain route requests within a deterministic time period and network bandwidth while at the same time using deterministic local client resources, such as HEAP memory which is, as people skilled in the art will appreciate, only available in small allocations for various wireless devices, including cellular phones. This functionality is deterministic since the local client is guaranteed to only be sent a predefined amount of route data which is determined by the characteristics of the route snapshot, which is further defined under the assumption that polyline data is typically uniform in practice. As people in the art shall appreciate, a route snapshot reduces the need to decimate map vector data, since a local client is guaranteed to be provided with a fixed amount of route data. Reducing the need to decimate map data keeps the map vector data as accurate as possible such that the accuracy of navigation computations is preserved.

It is an object of the present invention that the off-board navigation route consists of audio navigation voice prompts for properly announcing the maneuver of the current, next, and/or any route turn within the route or inside the route snapshot. It is an additional object of this invention that these audio navigation voice prompts can be combined in any manner to form stacked turns announcements, such as "Turn Right on Lawrence Road, then Turn Left on Bardeen Avenue".

It is an object of the present invention that the off-board navigation route consists of a finite number of audio navigation voice prompts which is related to the size of the route snapshot. For each route snapshot, the remote client and/or server system sends the audio navigation voice prompts and pronunciations codes for all of the turns or maneuvers contained within the route snapshot. The pronunciation codes are correlated with the audio information of each route turn or maneuver. In one embodiment, an XML file that includes route vector information and pronunciation codes that are mapped to binary audio navigation voice prompts is sent from the remote client and/or server system to the local mobile client which then displays the navigation information, such as by a limited cartography display, in addition to pronouncing the appropriate audio navigation voice prompts. The announcement of the audio navigation voice prompts is initiated based on various metrics, including but not limited to the current street that the mobile local client device is located on, the street of the next maneuver, and/or the next logical turn.

It is an object of the present invention that for each route snapshot that is requested by a local navigation client from a remote client and/or server system, the remote client and/or server system sends the appropriate route snapshot data in order to completely describe the route such that a computing device can display and announce the route similar to how a passenger provides directions while in a car.

TABLE 1

Output Route Snapshot Data from Remote Client and/or Server System

| Name | Type | Description |
| --- | --- | --- |
| Route Vector Polylines | XML Data | Provides a vector representation of the entire route snapshot |
| Base Voice Prompts | Audio File(s) | A basic set of audio files which can be concatenated with maneuver-specific audio files to generate specific audio messages |
| Audio Prompt Configuration | XML Data | An XML file which specifies which base and maneuver-specific audio files to concatenate and in what order to generate each message |

It is an object of the present invention that for each route snapshot that is requested by a local navigation client from a remote client and/or server system, the remote client and/or server system send each step for the route (i.e., the turn or maneuver) in addition to the pronunciation codes for each step/maneuver in the route, including: 1) the current street ("origin pronunciation value"); 2) the street of the next maneuver ("destination pronunciation value"); and 3) the street of the next logical turn ("turn pronunciation value"). For example, if a user is traveling on "I-405" and needs to exit at "Macarthur Boulevard" then turn right on "Lawrence Road", the current street is denoted as "I-405" freeway, the next maneuver would be the exit at "Macarthur Boulevard", and the next logical turn would be "Lawrence Road". In this example, the announced instruction could be "Continue on the I-405 for 2.3 miles, then exit highway on the right at Macarthur Boulevard, then turn right on Lawrence Road". It is an additional object of the present invention that every maneuver can include the complete announcement information (i.e., origin, destination, and turn pronunciation values)

for every road segment along the route. For example, the last portion of the route can be announced as "Continue on Campus Drive for 1.2 miles, then turn right on Bardeen Avenue towards Your Destination". In this embodiment, the origin, destination, and turn pronunciation values are "Campus Drive", "Bardeen Avenue", and "Your Destination", respectively.

It is an object of the present invention that for each new route snapshot that is requested by a local navigation client from a remote client and/or server system, the remote client and/or server system then sends both the pronunciation codes and their respective audio navigation voice prompts (i.e., sound files) to the local client. It is another object of this invention to store or cache on any storage medium of the local client (i.e., disk, memory, tape, etc.) both the pronunciation codes and their respective audio navigation voice prompts either during the route, during the application session, or up to a certain cache size limitation of the local client, as is the case with many resource-limited wireless devices. If a user is re-routed, which, as people in the art will appreciate, is typically defined as a route being recalculated due to the user going off the current or provided route, and where route data is typically currently not available to the local client, then the local client requests a modified route (i.e., recalculate route) based on, but not limited to, the user's previously defined destination and current GPS location. In one embodiment, as further illustrated in the following table, the route maneuver data is mapped and associated with a pronunciation code ID, which defines or references an audio filename. When the audio file is played, it pronounces the preferred name of the road of the specific route maneuver contained within the route snapshot.

TABLE 2

Mapping of Pronunciation Codes to Audio

| Maneuver | Pronunciation Code ID | Audio File Name | Audio Sound |
|---|---|---|---|
| Lawrence Road | 1 | 1.qcp | "Lawrence Road" |
| Larkfield Lane | 2 | 2.qcp | "Larkfield Lane" |
| Bardeen Avenue | 3 | 3.qcp | "Bardeen Avenue" |

It is an object of the present invention that for each new route snapshot that is requested by a local navigation client from a remote client and/or server system, the remote client and/or server system send all of the pronunciation codes and their respective audio navigation voice prompts (i.e., sound files) to the local client. As people skilled in the art will appreciate, any subsequent route recalculations or new route requests made by the local navigation client to the remote client and/or server system would include all of the current pronunciation codes that it has cached or stored locally, so that the remote client and/or server system need only send back the audio navigation voice prompts that the local client does not currently have stored on its local storage medium. Thus any route recalculations or subsequent new route requests will require that at most all of the audio navigation voice prompts are sent to the local client. However, in most instances, since the recalculated or new route usually overlaps the original route, only the differential or changed audio navigation voice prompts need to be sent back to the local client, since it already has a local copy of the audio files stored. This can significantly reduce the amount of required bandwidth for any route request other than the initial route request, specifically for routes with common destinations, since audio files typically account for the bulk of the response from the remote client and/or server system.

It is an object of the present invention that new audio navigation voice prompts that are sent from the remote client and/or server system to the local client have minimal redundancy, such that if any of the pronunciation codes and their respective audio navigation voice prompts are the same, such as similar road names, the remote client and/or server system will only send one file of the audio navigation voice prompt, but may send multiple pronunciation code IDs. In one embodiment, a route that includes two maneuvers with similar names, such as two "Main Street" maneuvers in different towns, would include two pronunciation code IDs that relate to the appropriate maneuver. Each Main Street maneuver will have its own pronunciation code ID, but will reference the same "Main Street" audio navigation voice file. That is to say, that only one "Main Street" voice file will be sent from the remote client and/or server system to the local client for this request, thereby reducing bandwidth usage.

It is an object of the present invention that new audio navigation voice prompts that are retrieved from the remote client and/or server system which need to be stored on the local device will be removed using various methods, such as by the created date/time, accessed date/time, size, or the like. In one embodiment, due to the limited storage resources of the local device, these audio files can be removed based on age, such that the newest audio files that were most recently used within the navigation algorithm on the local client are kept in preference over older audio files that had not been recently used. In one embodiment, the local client has a plurality of audio files stored in its local cache. When requesting a new route, it sends the listing of all the stored Pronunciation Code IDs to the server system and the server system sends back a list of all the new Pronunciation Code IDs, and audio files for only the audio files that are not stored on the local client's cache. Given that in this embodiment the local client is able to store only 100 audio files at any given time, when the server system returns to the local client six new maneuver audio files for a route consisting of twenty maneuvers, since the local client has some of the audio files stored locally already, the local client will remove a portion of the 6 oldest used audio files contained within the local client's cache in order to make room for the new audio files.

It is an object of the present invention that when requesting a route from the remote client and/or server system, the local client can send to the server system either: 1) a list of current Pronunciation Code IDs that are, stored locally on the client's cache; or 2) a route ID. For solution 1), the server does not need to preserve the client's state on the server. For solution 2), the server needs to store a record of previous requests such that it knows or mirrors which audio files are stored on the device. This method slightly reduces bandwidth, but it is usually not worth the effort given the present day speed of computer systems. As people skilled in the art will appreciate, this mirroring of which audio files are stored on the local device versus the remote client and/or server system can be implemented in various ways and is preserved in this invention.

It is an object of the present invention that when the local client requests route data from the remote client and/or server system, the local client has the option to send N number of previous GPS history points that it has collected so that the server can more accurately pinpoint the local client's actual position relative to the vector map data for use in computing the start of the route. These previous GPS history points can be filtered by distance prior to being sent to the remote client and/or server system, such as every 10 meters, in order to better model the local client's GPS history trail and mitigate the need to send redundant GPS information (i.e., points that are effectively on top of each other would not be sent, etc.). Vector map data is typically inaccurate, and coupled with GPS inaccuracies, this makes it very difficult to correctly represent the actual location of the local client from a single GPS point. As people skilled in the art will appreciate, using a set of GPS history points, the remote client and/or server system can extrapolate the most logical position of the local client reducing the need for multiple re-routes in almost all scenarios.

BRIEF DESCRIPTION OF THE DRAWINGS

FIG. 8 illustrates one embodiment of a Route "Recalc";

FIG. 9 illustrates one example of a XML schema for the communication between the client and server in accordance with one embodiment of the present invention;

DETAILED DESCRIPTION OF THE EMBODIMENT

The present invention provides a method and system for providing real-time navigation instructions to the user of a mobile computing device such as a mobile phone or personal digital assistant. These navigation instructions include but are not limited to text presented on the screen, audio and voice messages. The present invention may be embodied in a mapping and navigation application, such as the "AtlasBook Navigator 3.1" application owned and licensed by Networks In Motion, Inc. of Irvine, Calif.

Figure 1:
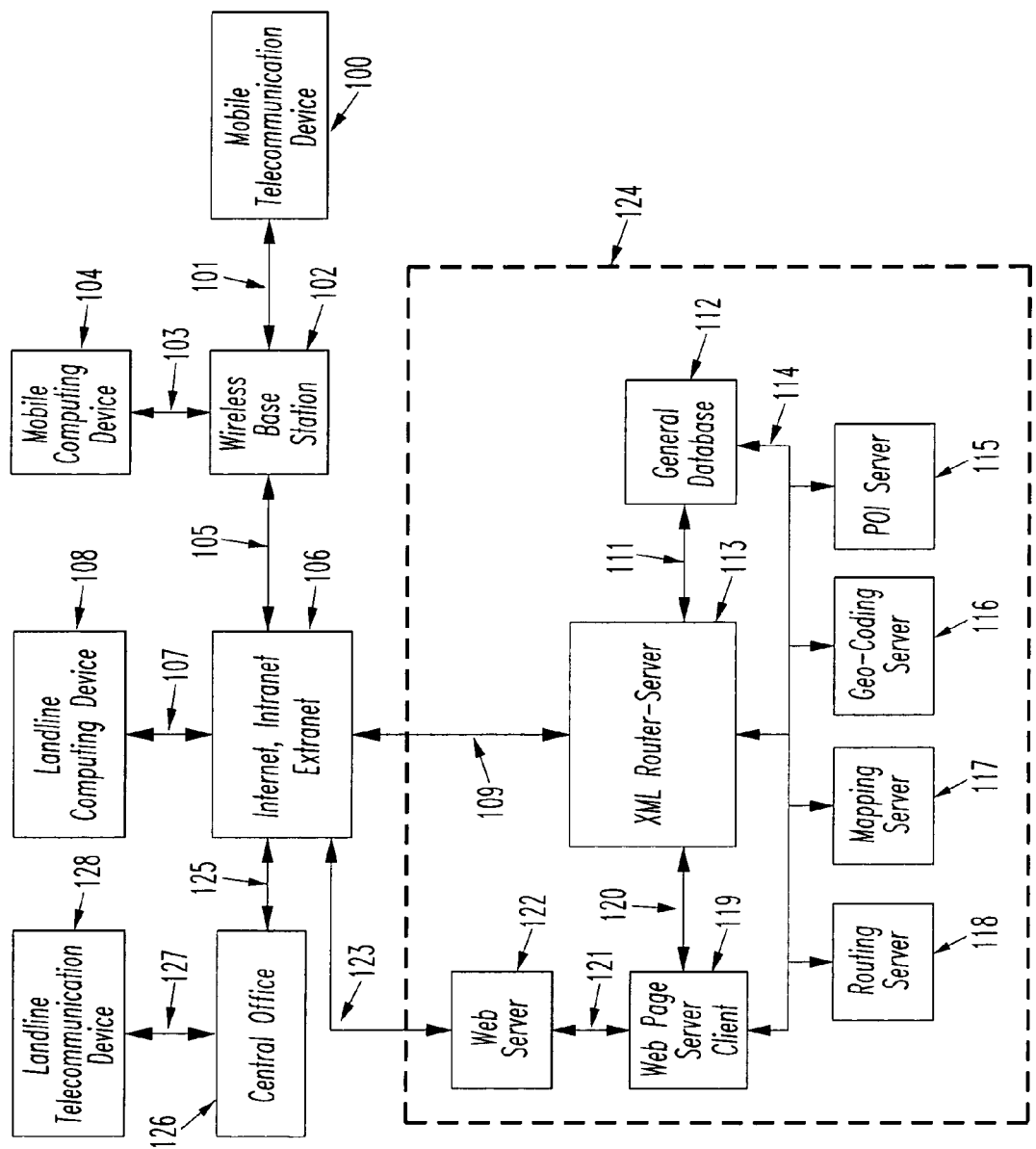
FIG. 1 illustrates a network system for providing a communication channel between various wireless and landline computing devices.
Figure 2:
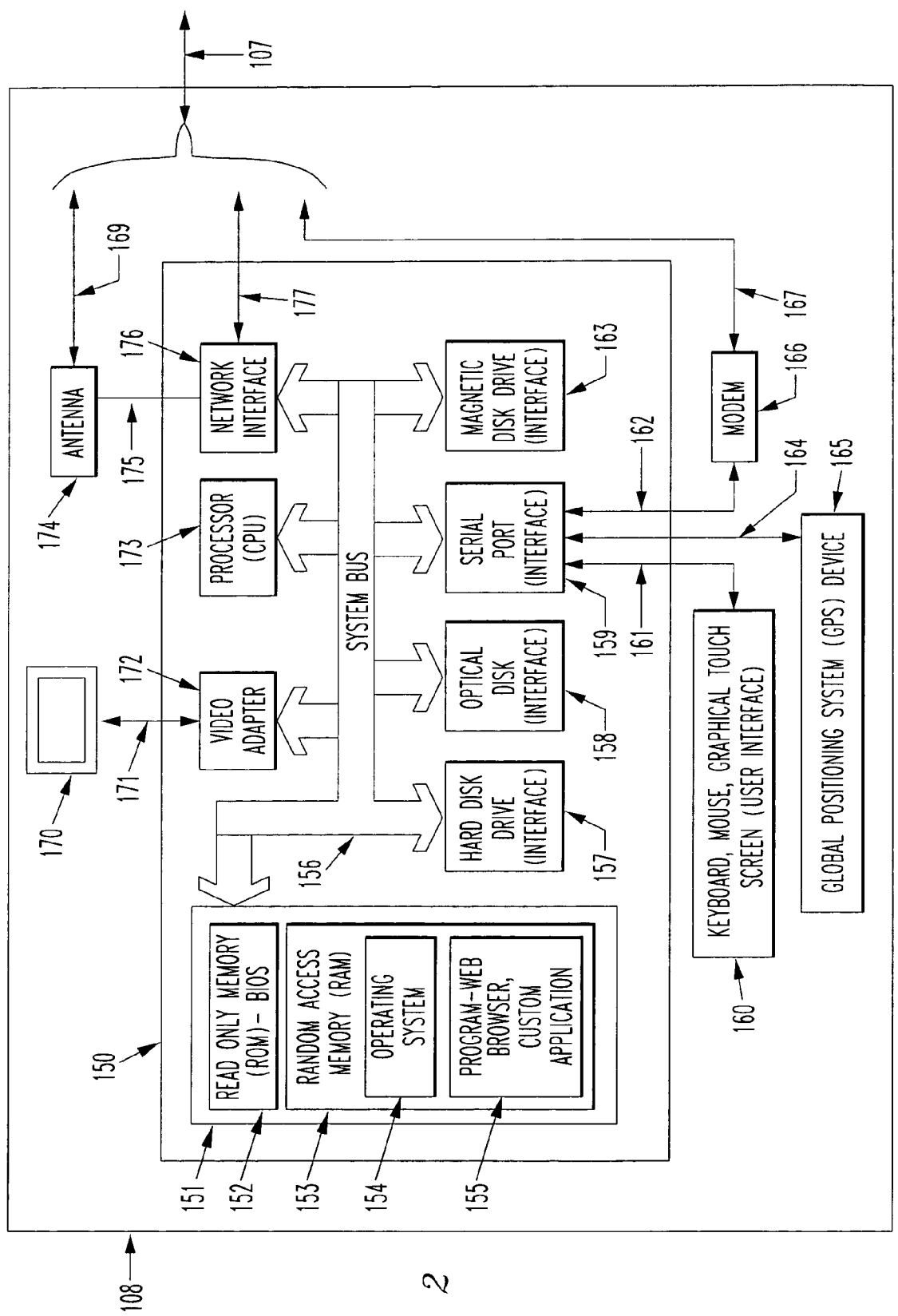
FIG. 2 illustrates one embodiment of the present invention showing a personal computer with an integrated web browser.

FIG. 1 and FIG. 2 illustrate high-level diagrams of one embodiment that is a suitable computing and networking environment in which the invention may be implemented. The invention will be described in the general context of an application that executes on an operating system in conjunction with a personal computer or server, but those skilled in the art will realize that this invention may also be implemented in combination with other program modules. Program modules typically include routines, programs, data structures, etc. that perform particular tasks or implement particular abstract data types. This invention is not limited to a typical personal computer, but may also be utilized with other computing systems, such as handheld devices, mobile lap top computers, wireless phones, in-vehicle navigation systems, programmable consumer electronics, mainframe computers, distributed computer systems, etc., and the like.

FIG. 1 is a network block diagram illustrating the connection (127 & 101) of both wireless 100 and wired 128 Telecommunication devices to an Application Service Provider (ASP) 124, also referred to as an online server system. This online server system may be configured at a single location and on a single computer, or can be configured as a distributed computer system and at different locations. The wireless Mobile Telecommunication Devices 100 are wirelessly connected 101 to a nearby wireless base station 102, which are typically connected or have access to 105 the Internet, Intranet, or Extranet 106. Additionally, a landline Telecommunication Device 128 is typically connected to a nearby central office 126 which is connected or has access to 125 the Internet, Intranet, or Extranet 106. Additionally, the Application Service Provider (ASP) 124 also has access 109 to the Internet, Intranet, or Extranet 106. The ASP 124 generally consists of a front-end firewall and XML router 113 which itself has access (111 & 114 & 120) to other local computing modules, such as a database 112, POI server 115, geocoding server 116, mapping server 117, routing server 118 and webpage client server 119. The web-server front-end 119 can be connected to the outside Internet, Intranet, or Extranet 106 either through the local front-end firewall 113, or as in this embodiment, via 121 the web server 122, which is connected 123 directly to the Internet, Intranet, or Extranet 106 by using a software firewall which is well known to those skilled in the art. Additionally, either mobile 104 or landline 108 computing devices, such as a personal computer, are connected to the Internet, Intranet, or Extranet 106, either directly 107 or through a wireless connection 103 and base station 102.

FIG. 2 illustrates a typical personal computer 150 that includes a central processing unit (CPU) 173, video adapter 172, hard disk drive 157, optical disk 158, serial port 159, magnetic disk drive 163, system bus 156, and network interface 176 & 177 & 167 & 169 & 109. The hard disk drive 157 typically refers to a local non-volatile storage system for storing large amounts of data, such as a web browser program files or cookies or a user's Contact data. The optical disk 158 typically refers to a CD-ROM disk used for storing read-only data, such as an installation program. The serial port interface 159 is typically used to connect 161 the computer 150 to external devices 160, such as a keyboard, mouse, and graphical touch screen interface, and also can connect 164 to positioning devices 165, such as a GPS receiver. The keyboard and mouse 160, amongst other input devices 165, enable users to input information into the computer 150. The connection 161 & 164 cables can include a serial cable or universal serial bus (USB) cable. Other input devices, that are not shown, may include a joystick, scanner, camera, microphone, or the like. The magnetic disk drive 163 is typically used to store small amounts data, in comparison to a hard 157 or optical 158 disk drive, and typically lacks the data transfer rates of those other storage drives, but it enables both readable and writable capability. The hard disk drive 157, optical disk drive 158, serial port interface 159, and magnetic disk drive 163 are all connected to the main system bus 156 of the computer 150 for transferring data. A monitor 170 or other type of display device, such as a LCD display, is connected 171 to the computer system's 150 video adapter 172, which is connected to the system bus 156. Additional peripheral output devices, which are not included in this embodiment, such as a printer, speaker, etc., can also be connected to a personal computer 150. The system bus 156 also connects to the network interface 176, central processing unit (CPU) 173, and system memory 151. The system memory 151 contains both random access memory (RAM) 153, and read only memory (ROM) 152, that typically consists of the BIOS (Basic Input/Output System) of the computer, necessary for containing basic routines that enable the transfer of information between elements within the personal computer 150. The RAM 153 stores a number of program modules, such as the web browser and synchronization applications 155, and the Operating System 154 of the personal computing device 150 or personal computer 150. One example of such a program module 155 would be a web browser that is connected to the "AtlasBook" server that was previously mentioned.

Figure 3:
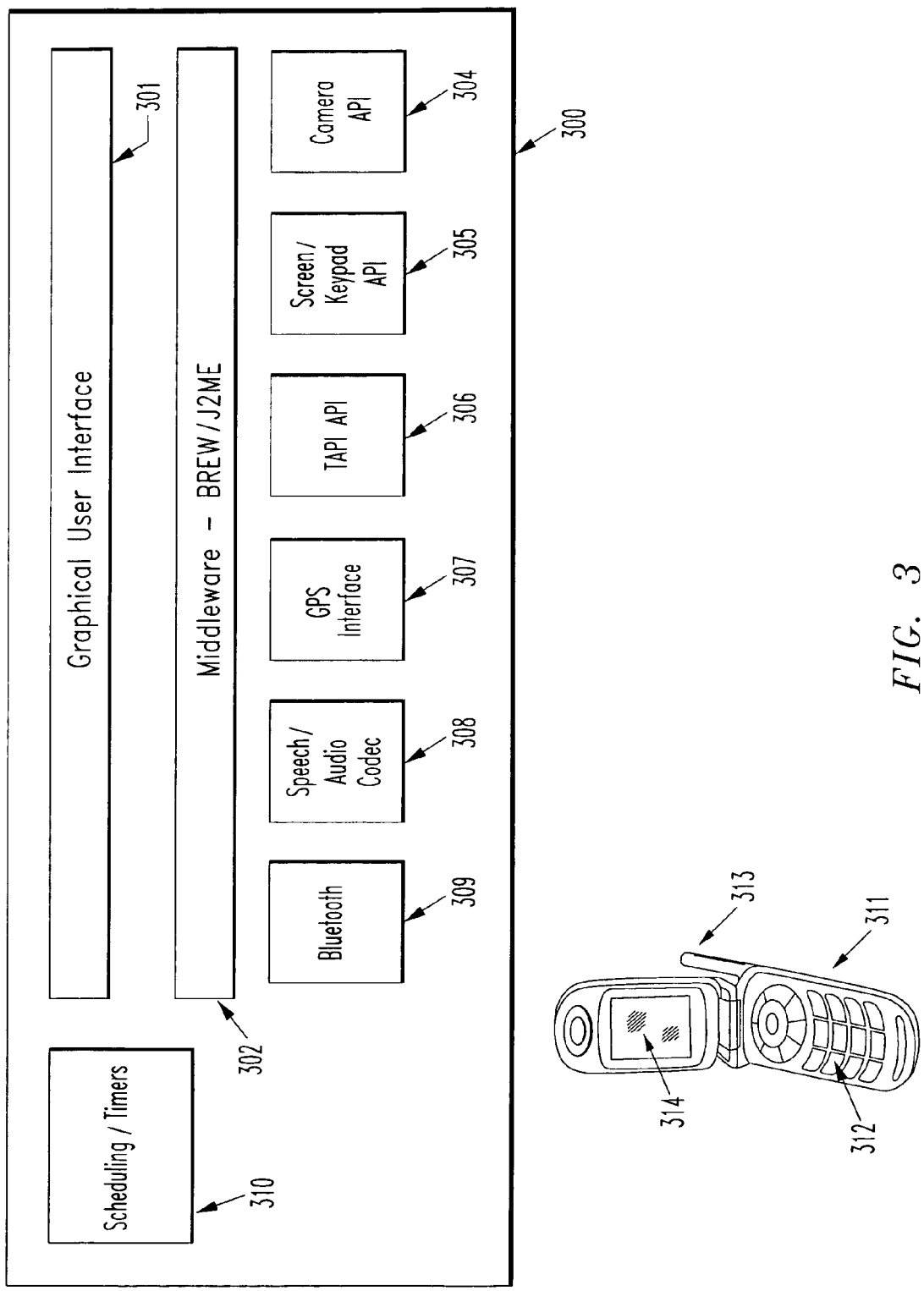
FIG. 3 illustrates one embodiment of the present invention of a wireless telecommunication device and an accompanying high-level block diagram of a wireless Telecommunication Device.

FIG. 3 illustrates a next generation wireless Telecommunication Device 311 which typically includes a display 314, an antenna 313, and a keypad 312. The next generation wireless Telecommunication Device 311 & 300, as illustrated in FIG. 3, provides a foundation 302 for running programs or applications that can access the Telecommunication Device's 311 internal interfaces, such as the Bluetooth 309, Speech/Audio Codec 308, GPS Interface 307, TAPI (Telephony Application Program Interface) 306 Interface, Screen/Keypad API (Application Program Interface) or Interface 305, Camera API 304, or the like as well known to those that are skilled in the art. As those that are skilled in the art will appreciate, a Telecommunication Device (300 & 311) will also include scheduling/timers 310 for scheduling specific events as is provided with standard computing platforms. Additionally, next generation Telecommunication Devices (300 & 311) have graphical user interfaces (GUI) 301 for applications to allow user input using a graphical display 314. As people skilled in the art will appreciate, these next generation Telecommunication Devices provide the means to access the Telecommunication Devices' internal APIs using a middleware 302 platform, such as J2ME or BREW, which are both well known to those skilled in the art. This simplifies the development process since there is significant support for obtaining developer's access to the Telecommunication Devices internal APIs, such as the GPS interface for determining the device's position.

Figure 4:
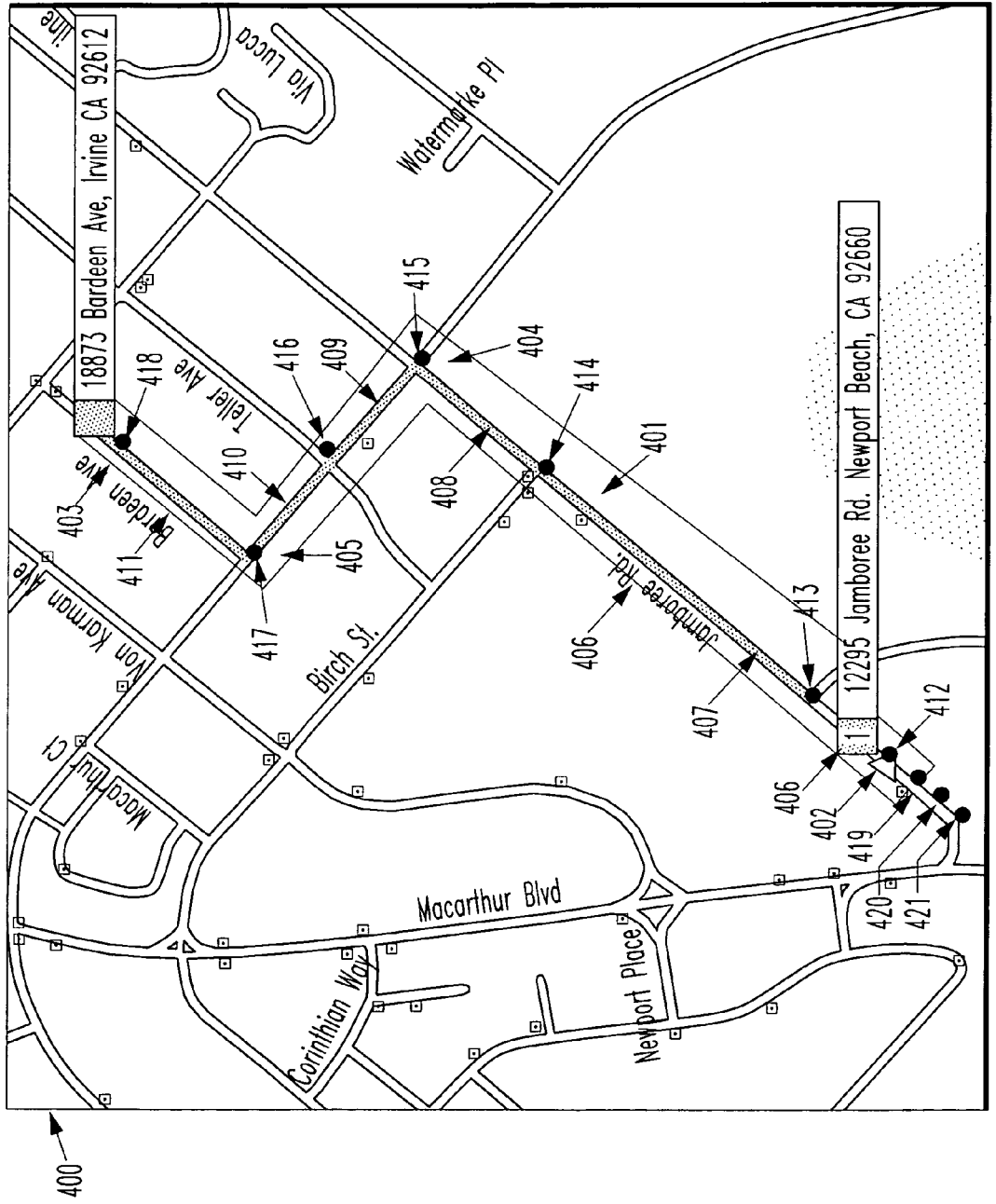
FIG. 4 illustrates one embodiment of typical navigable route.

FIG. 4 illustrates a map 400 which displays the elements of a typical navigable route 401 including an origin point 402, destination point 403, and several maneuver points 404 & 405. The route to be navigated is represented by a polyline 406 which consists of several line segments 407 & 411 which are defined by a series of geographic points 412 & 418. This figure illustrates a relatively simple route, but those skilled in the art will realize that many more complex route will be generated based on the distance between the origin 402 and destination 403, and the need to make more complex navigational maneuvers such as U-turns, complex series of left and right turns, entering/exiting of limited access highways, etc. Also illustrated are the historical GPS points 418 & 421 sent to the server to assist in the calculation of the route.

Figure 5:
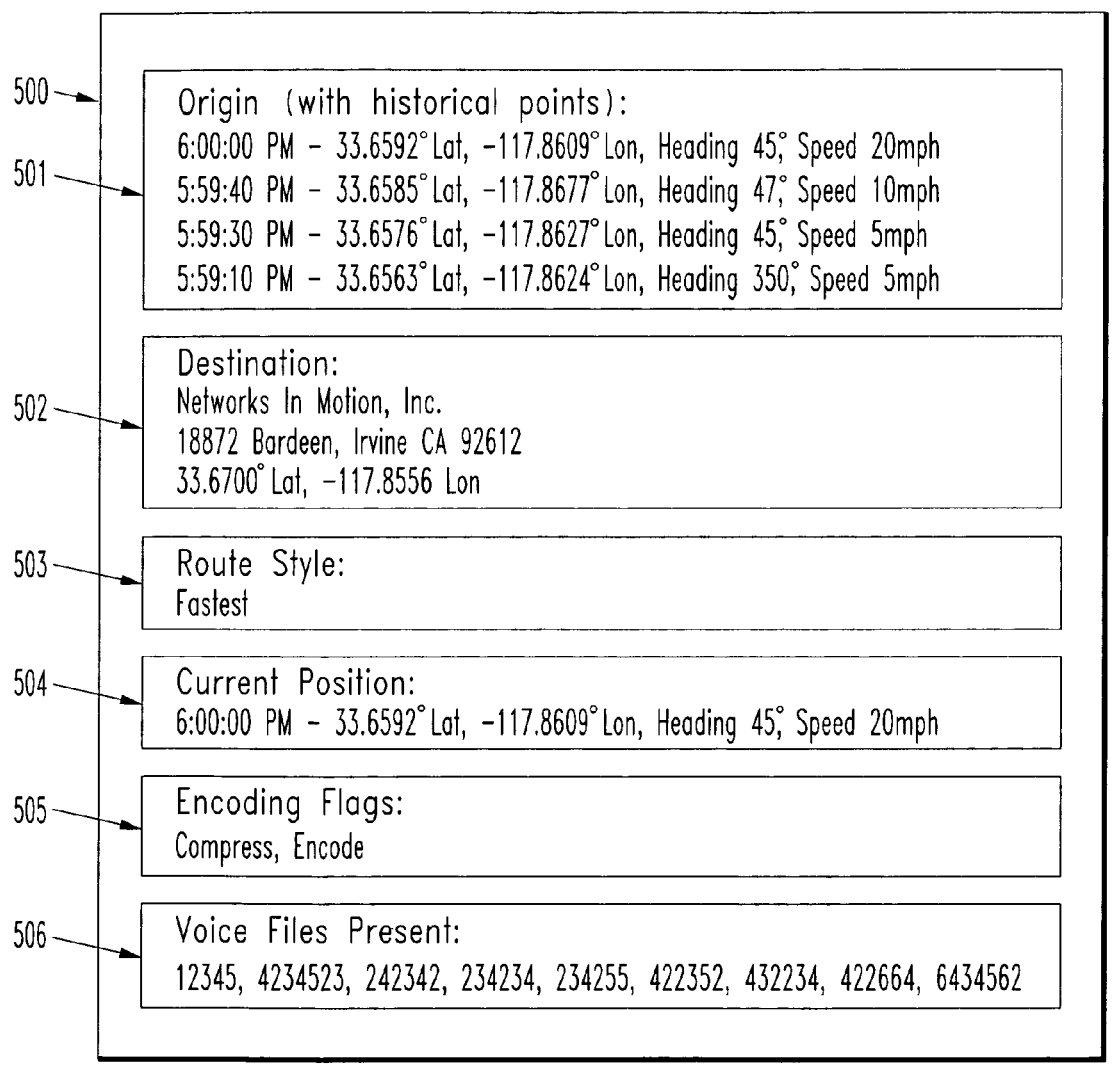
FIG. 5 illustrates one embodiment of a Route Information Request.

FIG. 5 illustrates a typical route information request 500 which contains the origin (including historical points) 501, the destination 502, the route style 503, the encoding flags 504 which describe how the data should be transmitted, and list of the voice files currently present in the memory of the navigation device 505.

Figure 6:
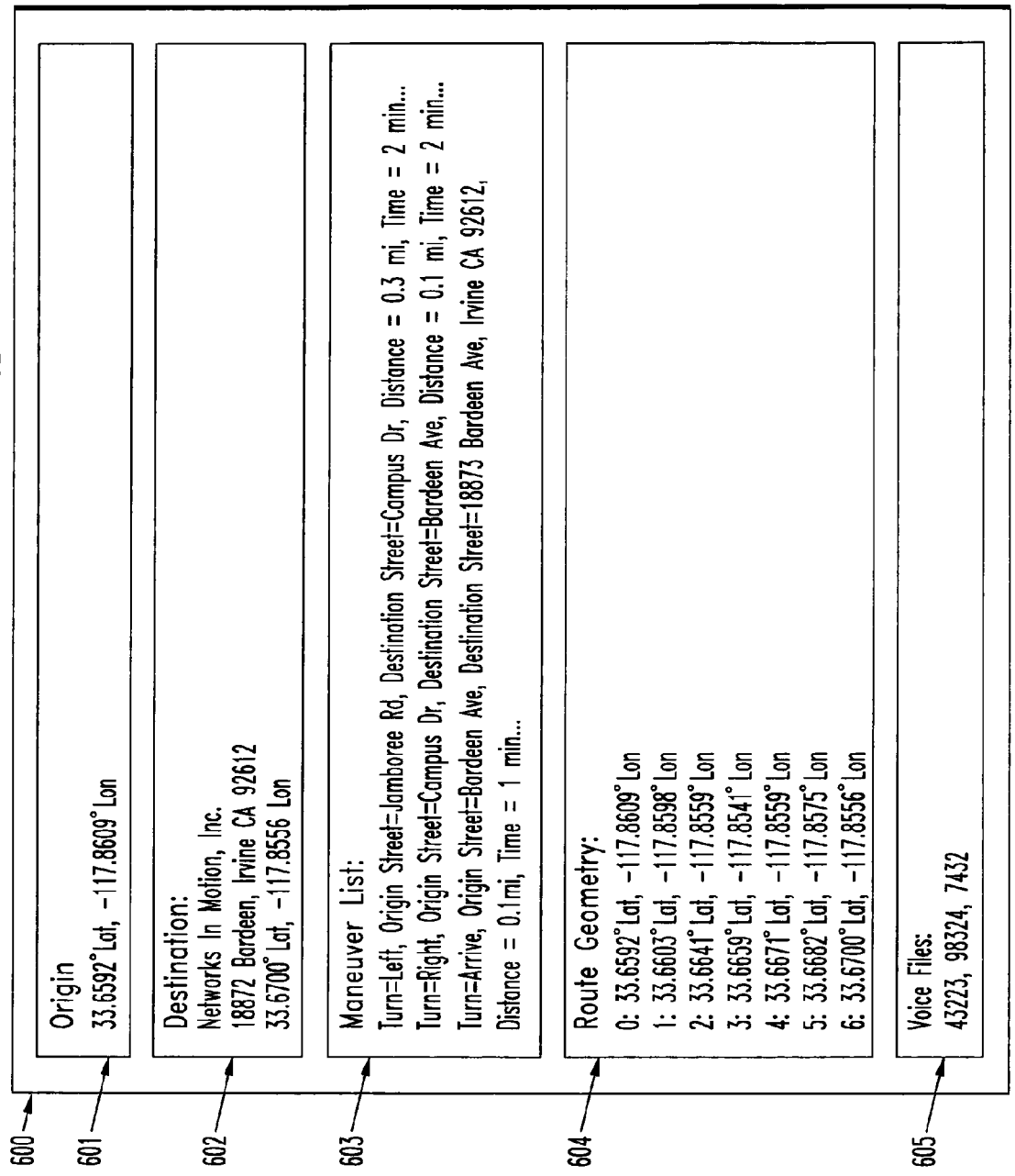
FIG. 6 illustrates one embodiment of a Route Information Response.

FIG. 6 illustrates a route information response 600 corresponding to the request illustrated in FIG. 5. This response contains the origin 601 of the route, the destination 602 of the route, the maneuver list 603, the route geometry 604, and the corresponding voice files 605.

Figure 7:
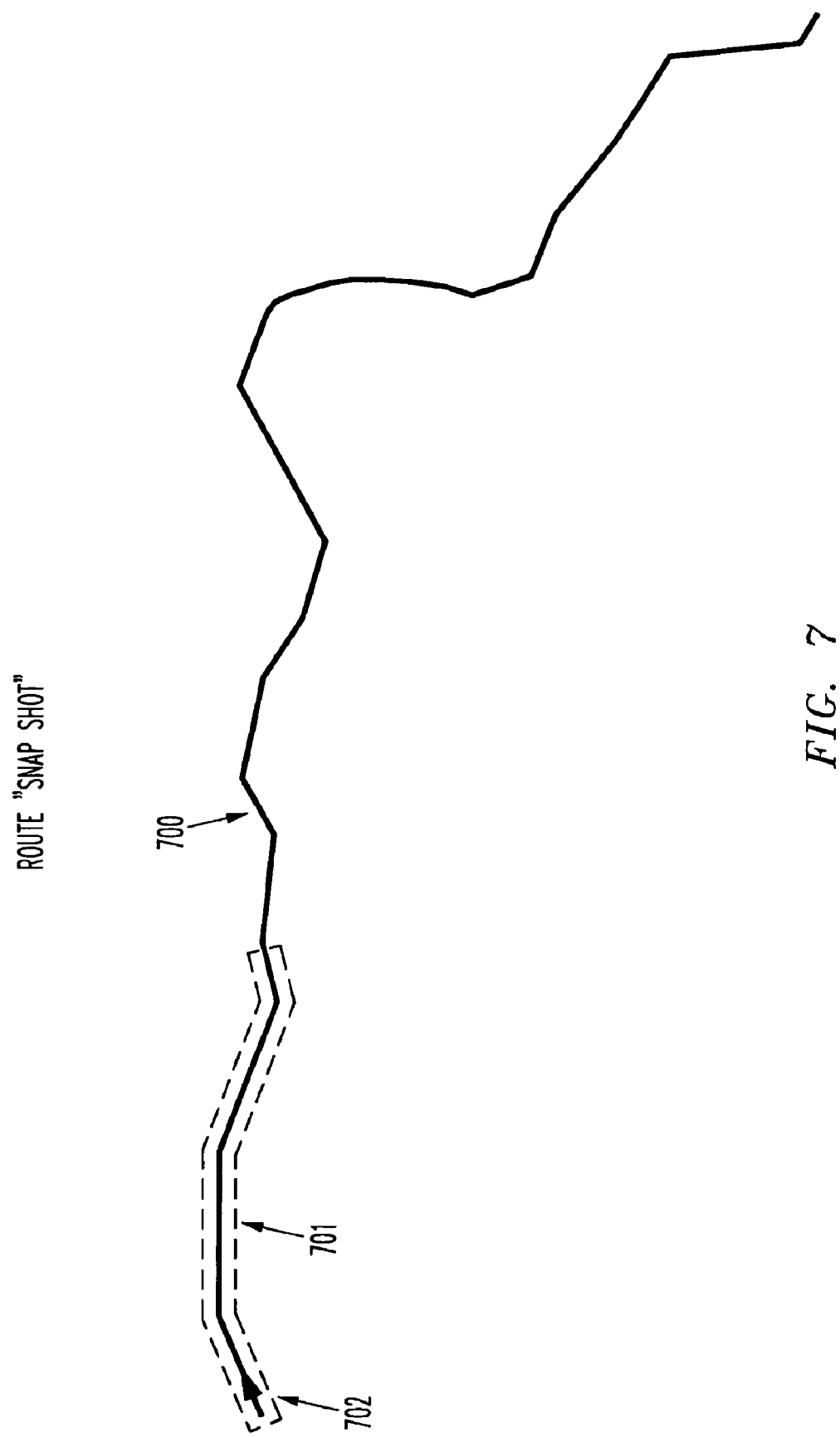
FIG. 7 illustrates one embodiment of a Route "Snap Shot"

FIG. 7 illustrates a route "snap shot" 701 which represent a bounded portion of the route 700 corresponding to the position 702 of the user.

FIG. 8 illustrates a route "recalc". The original route 800 is illustrated as well as the new route 801 which is generated by the "recalc" when the user makes a wrong turn 802.

In the preferred embodiment of the present invention the user begins the process of navigation by selecting a destination. Those skilled in the art will realize that there are many potential sources for obtaining a destination point which include but are not limited to Yellow Page POI searches, address books, recently used destinations, or manually entered addresses. After the user has selected a destination, the mobile phone or other mobile computing device which is serving as the navigation device will utilize its internal GPS receiver or in another embodiment an external GPS device connected to the device through a wired or wireless interface to obtain a GPS fix representing its current position. This GPS fix along with the desired destination is combined with the user's routing preferences (which include some or all of the following: route type [fastest, simplest, avoid highways, etc.], roads to avoid, etc) and optionally with a historical set of the user's GPS positions in the past. These historical positions if present allow the server to more accurately determine the user's true position since any single GPS point could contain significant error and the direction of travel may not be clear. These historical positions would also allow the server to correct for errors in its map database by employing pattern matching techniques familiar to those skilled in the art. Also included in this request are the pronunciation codes representing the voice files currently residing in the memory of the navigation device. This request for route information is illustrated in FIG. 5. When the route request is received by the ASP server, the route to be traveled from the origin to the destination point is calculated. The route information is then transmitted to the client navigation device over the wireless internet connection. The route information transmitted to the client navigation device may include, but is not limited to the following: route origin, route destination, a list of maneuvers which are made up of multiple elements described below, the geometry of the route, and set of voice files needed to generation the audible instructions to the user. Each maneuver may contain, but is not limited to the following: turn type, next turn type (if a stacked turn is indicated), location of turn, starting offset in the route geometry, length of the maneuver in the route geometry, origin street name, destination street name, distance to travel before the turn, estimated time to travel before the turn, distance from the turn to the destination, estimated travel time to the end of the route, estimated travel speed, original heading, maximum distance for audible instruction, pronunciation code for origin street, pronunciation code for destination street, pronunciation code for towards street (used to provide addition information for selected maneuvers. The list of voice files returned consists of those files which are necessary to provide instructions for the current route, but does not include any files which are already present in the cache of voice files stored on the navigation device. This route information response is illustrated in FIG. 6. Someone skilled in the art will realize that the ability to transmit only those files which are not present in the cache on the device will greatly reduce the amount of data which needs to be transmitted over the wireless data connection since the voice files comprise the majority of the data transmitted. The route information transmitted from the server to the client navigation device will not necessarily include the entire route, rather is will consist of a limited "snapshot" or route information beginning at or slightly behind the user's current position and proceeding toward the destination for some limited distance. An example of this route "snap shot" is illustrated in FIG. 7. This information will be sufficient for the user to navigate for a significant period of time, but would be bounded to a reasonable size. The use of such a "snapshot" is important because the navigation device may not contain sufficient memory to store all the route information necessary to reach the destination. Since this "snapshot" is guaranteed not to exceed a certain size, the use of memory and transmission time to the navigation device is bounded and guaranteed not to become extravagant. This solution is superior to other alternative methods of limiting data size such as decimation of the route geometry data because it maintains the full accuracy of the route geometry, this allows for more accurate navigation instructions. Once the route information has been received by the client navigational device, it will proceed to instruct the user to navigate the intended route. If the user does not follow the instructions provided and leaves the provided route, a new route to the destination will be automatically calculated and the user will be apprised that a new route has been found. An illustration of how this "recalc" could occur is found in FIG. 8. This "recalc" will be completed more quickly than the initial route calculation because the number of voice files that will need to be transmitted to the client navigation device will most likely be quite minimal since the new route is likely to be very similar to the old route with only minor differences necessary to navigate from the user's current position back to the intended route. If the voice file caching system described in the present invention was not employed, the recalculation of the route would be delayed by the need to retransmit all of the voice files for the route even if most of them are already present in the memory of the client navigation device.

In accordance with one embodiment of this invention, the communication between the navigation device and the ASP server is ideally carried out using XML messages conforming to the XML schema. FIG. 9. shows an example (one of many examples) of a schema in the XML format. This example of schema is an extension of those defined in the OpenLS RPC. This example schema also includes definitions of the communication between the client and the server sufficient for one skilled in the art to understand and implement that communication channel. Someone skilled in the art will realize that many other possible communication protocols could be used to accomplish the same communication and the present invention is not limited to this preferred embodiment.

Figure 10:
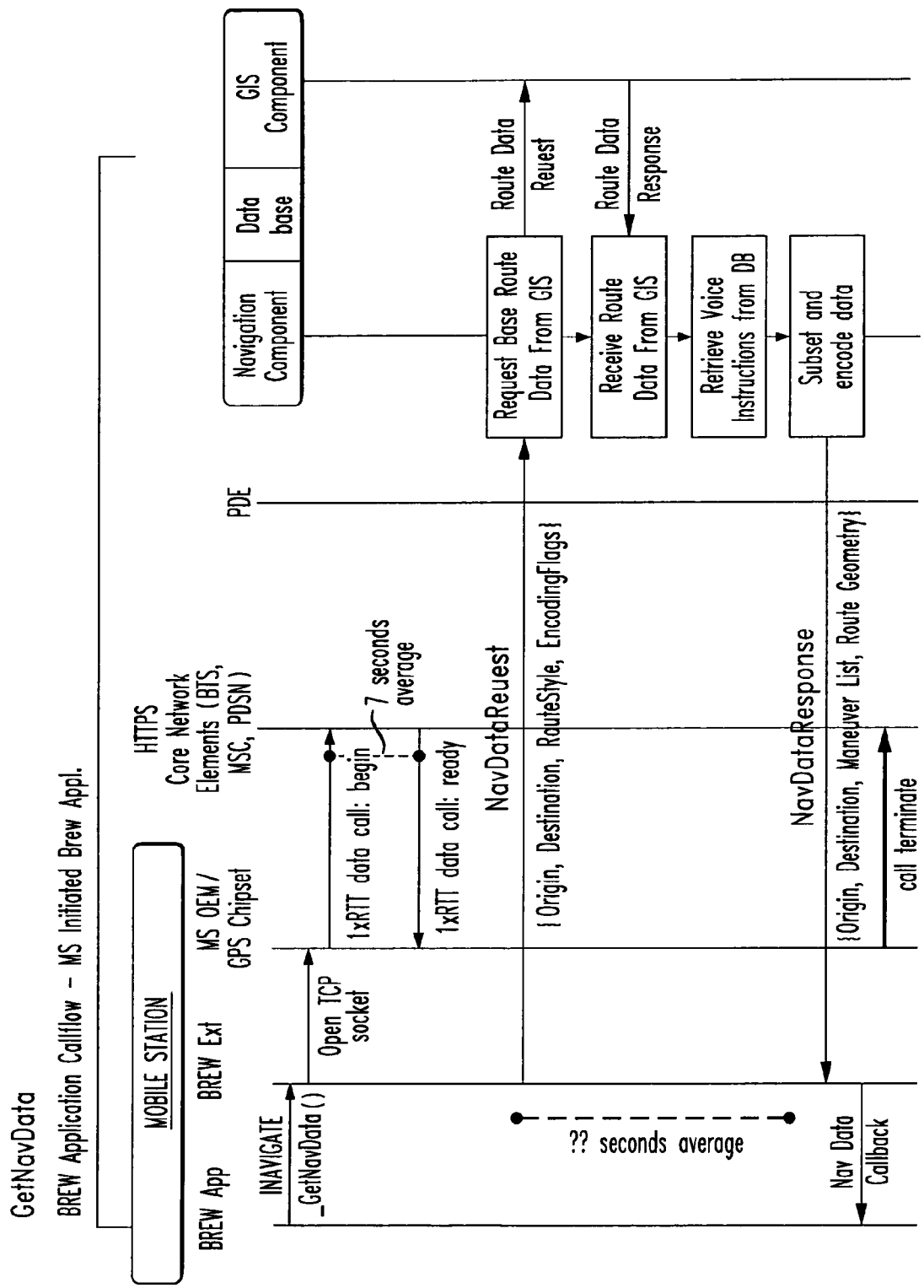
FIG. 10 illustrates one embodiment of a GetNavData request which is based on this invention.

FIG. 10 illustrates one embodiment of present invention for implementing the call flow of getting route vector data for the purpose of implementing a navigation client on a local mobile wireless device based on Qualcomm's BREW platform.

Figure 11:
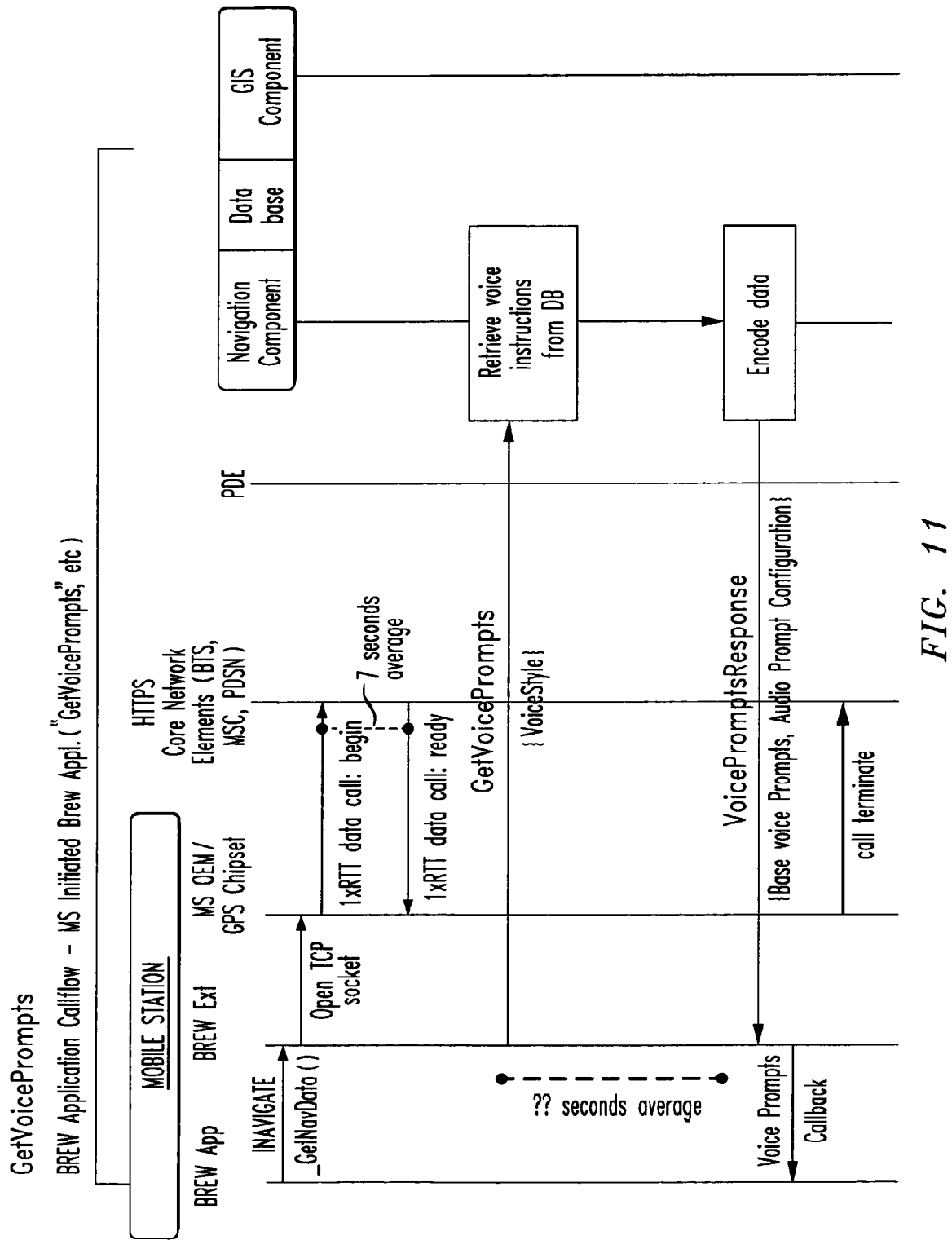
FIG. 11 illustrates one embodiment of a GetVoicePrompts request which is based on this invention.

FIG. 11 illustrates one embodiment of present invention for implementing the call flow of getting navigation voice prompts based on this invention for a navigation client on a local mobile device based on Qualcomm's BREW platform.

It should be noted that the present invention may be embodied in forms other than the preferred embodiments described above without departing from the spirit or essential characteristics thereof. The specification contained herein provides sufficient disclosure for one skilled in the art to implement the various embodiments of the present invention, including the preferred embodiment, which should be considered in all aspect as illustrative and not restrictive; all changes or alternatives that fall within the meaning and range or equivalency of the claim are intended to be embraced within.

What we claim:

1. A method for providing routing directions to a mobile communication device, comprising:
   receiving, from a mobile communication device, a routing information request including identification of a voice file stored in a physical memory of said mobile communication device;
   recalculating, with a server, routing information for said mobile communication device; and
   transmitting, to said mobile communication device, said routing information excluding said voice file stored in said physical memory of said mobile communication device.

2. A method for providing routing directions to a mobile communication device according to claim 1, wherein:
   said physical memory is a cache memory.

3. A method for providing routing directions to a mobile communication device according to claim 1, wherein:
   said voice files are pronunciation codes.

4. A method for providing routing directions to a mobile communication device according to claim 1, wherein:
   said routing information request includes GPS data indicating a geographic location of said mobile communication device.

5. A method for providing routing directions to a mobile communication device according to claim 1, wherein:
   said routing information further includes map data to generate a graphic map on said mobile communication device.

6. A method for providing routing directions to a mobile communication device according to claim 1, wherein:
   at least a portion of said routing information is Extensible Markup Language (XML) data.

7. A method for providing routing directions to a mobile communication device according to claim 1, wherein:
   said routing information request is triggered in response to said mobile communication device straying from a previously calculated routing information.

8. A method for providing routing directions to a mobile communication device, comprising:
   transmitting, from a mobile communication device, a routing information request including identification of a voice file stored in a physical memory of said mobile communication device;
   receiving, from a server, recalculated routing information excluding said voice file stored in said physical memory of said mobile communication device.

9. A method for providing routing directions to a mobile communication device according to claim 8, wherein:
   said physical memory is a cache memory.

10. A method for providing routing directions to a mobile communication device according to claim 8, wherein:
    said voice files are pronunciation codes.

11. A method for providing routing directions to a mobile communication device according to claim 8, wherein:
    said routing information request includes GPS data indicating a geographic location of said mobile communication device.

12. A method for providing routing directions to a mobile communication device according to claim 8, wherein:
    said routing information further includes map data to generate a graphic map on said mobile communication device.

13. A method for providing routing directions to a mobile communication device according to claim 8, wherein:
    at least a portion of said routing information is Extensible Markup Language (XML) data.

14. A method for providing routing directions to a mobile communication device according to claim 8, wherein:
    said routing information request is triggered in response to said mobile communication device straying from a previously calculated routing information.

* * * * *